US009650301B1

(12) United States Patent
Huang et al.

(10) Patent No.: US 9,650,301 B1
(45) Date of Patent: May 16, 2017

(54) SYNTHESIS OF A HOMOGENEOUSLY POROUS SOLID OXIDE MATRIX WITH TUNABLE POROSITY AND PORE SIZE (71) Applicants: Kevin Huang, Columbia, SC (US); Lingling Zhang, Columbia, SC (US)

(72) Inventors: Kevin Huang, Columbia, SC (US); Lingling Zhang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 565 days.

(21) Appl. No.: 13/957,999

(22) Filed: Aug. 2, 2013

Related U.S. Application Data (60) Provisional application No. 61/742,083, filed on Aug. 2, 2012.

(51) Int. Cl.
B05D 5/12 (2006.01)
C04B 35/50 (2006.01)

(52) U.S. Cl.
CPC .................... C04B 35/50 (2013.01)

(58) Field of Classification Search
CPC ................................................ C04B 35/50
See application file for complete search history.

(56) References Cited

U.S. PATENT DOCUMENTS

| 3,453,104 A | * | 7/1969 | de Marchi | ............. | B01D 39/10 264/43 |
| 2005/0238796 A1 | * | 10/2005 | Armstong | ........... | H01M 4/8885 427/58 |
| 2006/0199058 A1 | * | 9/2006 | Hiwatashi | ........... | H01M 4/9033 429/489 |
| 2010/0003897 A1 | * | 1/2010 | Kim | ........................ | C09G 1/02 451/41 |

OTHER PUBLICATIONS

Cheng et al., "Formation of $Ce_{0.8}Sm_{0.2}O_{1.9}$ Nanoparticles by Urea-Based Low-Temperature Hydrothermal Process", Journal of Power Sources, vol. 175, 2008, pp. 137-144.
Fang et al., "Synthesis and Properties of Ni-SDC Cermets for IT-SOFC Anode by Co-Precipitation", Solid State Ionics, vol. 158, Issues 1-2, Mar. 15, 2004, pp. 31-36.
Fukui et al., "Morphology Control of Ni-YSZ Cermet Anode for Lower Temperature Operation of SOFCs," Journal of Power Sources, vol. 125, Issue 1, Jan. 2, 2004, pp. 17-21.
(Continued)

Primary Examiner — Galen Hauth
(74) Attorney, Agent, or Firm — Dority & Manning, P.A.

(57) ABSTRACT

The present disclosure relates to a method for synthesis of a porous solid oxide matrix. The method includes synthesizing a composite by co-precipitating a porous ceramic material with a sacrificial material. The composite is sintered and the sacrificial material of the sintered composite is reduced. A porous solid oxide matrix is formed from the reduced and sintered composite. Porosity of the solid oxide matrix is controlled by a volume fraction of the sacrificial material or sintering temperature and a volume fraction of the sacrificial material. Pore size of the solid oxide matrix is controlled by sintering temperature and a volume fraction of the sacrificial material.

5 Claims, 5 Drawing Sheets (56) References Cited

OTHER PUBLICATIONS

Imhof et al., "Preparation of Titania Foams", Advanced Materials, vol. 11, No. 4, 1999, pp. 311-314.

Innocentini et al., "Permeability and Structure of Cellular Ceramics: A Comparison between Two Preparation Techniques", Journal of American Ceramics Society, vol. 81, Issue 12, Dec. 1998, pp. 3349-3352.

Jiang et al., "Electrochemical Performance of a Solid Oxide Fuel Cell Based on $Ce_{0.8}Sm_{0.2}O_{2.\delta}$ Electrolyte synthesized by a Polymer Assisted Combustion Method" Journal of Power Sources, vol. 165, Issue 1, Feb. 25, 2007, pp. 134-137.

Mori et al., "Investigation of the Interaction between NiO and Yttria-Stabilized Zirconia (YSZ) in the NiO/YSZ Composite by Temperature-Programmed Reduction Technique", Applied Catalysis A: General, vol. 245, Issue 1, May 30, 2003, pp. 79-85.

Rajamathi et al., "Macroporous Materials from Crystalline Single-Source Precursors through Decomposition Followed by Selective Leaching", Journal of Materials Chemistry, vol. 11, No. 10, 2001, pp. 2489-2492.

Sepulveda, "Gelcasting Foams for Porous Ceramics", American Ceramic Society Bulletin, vol. 76, Issue 10, 1997, pp. 61-65.

Sing et al., "Reporting Physisorption Data for Gas/Solid Systems", Pure and Applied Chemistry, vol. 57, No. 4, 1985, pp. 603-619.

Studart et al., "Processing Routes to Macroporous Ceramics: A Review", Journal of the American Ceramic Society, vol. 89, Issue 6, Jun. 2006, pp. 1771-1789.

Wu et al., "Influence of some Parameter on the Synthesis of Nanosized NiO Material by Modiied Sol-Gel Method", Materials Letters, vol. 61, Issues 14-15, Jun. 2007, pp. 3174-3178.

Xia et al., "Microstructures, Conductivities, and Electrochemical Properties of $Ce_{0.9}Gd_{0.1}O_2$ and GDC—Ni Anodes for Low-Temperatures SOFCs", Solid State Ionics, vol. 152-153, Dec. 2002, pp. 423-430.

Zhang et al., "High Conductivity Mixed Oxide-Ion and Carbonate-Ion Conductors Supported by a Prefabricated Porous Solid-Oxide Matrix", Electrochemistry Communications, vol. 13, Issue 6, Jun. 2011, pp. 554-557.

\* cited by examiner

SYNTHESIS OF A HOMOGENEOUSLY POROUS SOLID OXIDE MATRIX WITH TUNABLE POROSITY AND PORE SIZE

CROSS-REFERENCE TO RELATED APPLICATION

The present application is based on and claims priority to U.S. Provisional Application 61/742,083 having a filing date of Aug. 2, 2012, which is incorporated by reference herein.

BACKGROUND

Porous ceramics have a variety of applications in filters, sorbents, catalysis, gas separation membranes and fuel cells. By virtually controlling the composition and microstructure (porosity, pore morphology, pore size and distribution), a porous ceramic can exhibit very different physical and chemical properties to meet specific applications. To produce these application-specific porous ceramics, adequate fabrication techniques are required. A traditional way to make a porous ceramic is to mix the functional ceramic material with a fugitive pore former. When such a mixture is fired at elevated temperatures, the pore former is thermally decomposed into vapor phase, leaving behind pores within the original structure. This method, however, often results in non-uniform pore distribution due to uncontrollable grain growth in the course of sintering. In addition, uneven shrinkage caused by inhomogeneous distribution of pore formers lead to dimensional instability. It is particularly detrimental to multilayer ceramic structures such as solid oxide fuel cells when thin-films of large aspect ratio are present. To meet the increasing demand for porous ceramics with a controllable microstructure, numerous novel processes have been developed, representatives of which include methods of replica, direct foaming, and sacrificial template.

The "replica" technique is a relatively easy and well-established process; but it often produces products with degrading mechanical strength due to the cracked struts formed during the process. Since the pore sizes in the final ceramic parts are not directly related to the "pore formers" in the simple manner, the "direct foaming" method has the difficulty to control porosity. In contrast, the sacrificial template method involves sintering the matrix material with the sacrificial material at elevated temperatures and chemically removing the sacrificial material at low temperature (often at room temperature). Since the creation of porosity takes place at low temperature, the dimensional stability of the matrix can be ensured. More importantly, the porosity can be controlled by the volume fraction of the sacrificial template while the pore size and distribution can be tailored by the grain size and distribution of the sacrificial template material. However, one important requirement for this method is that the functional matrix material does not react with the sacrificial material at elevated temperatures.

While the porosity of the matrix can be easily controlled by the volume fraction of the sacrificial material, a homogeneous distribution of pores as well as pore size also requires special preparation methods. Wet-chemical routes are well known to produce fine particles with homogenous distribution. Methods such as modified pechini, combustion, hydrothermal, and co-precipitation are the most commonly practiced ones. Among these methods, the co-precipitation method is advantageous in that the co-precipitate has not only smaller particle sizes but also higher degree of homogeneity.

Nonetheless, alternative methodologies for tailoring properties of a porous ceramic for particular applications in catalysis, fuel cells and gas separation membranes would be desirable.

SUMMARY

The present disclosure relates to a method for synthesis of a porous solid oxide matrix. The method includes synthesizing a composite by co-precipitating a porous ceramic material with a sacrificial material. The composite is sintered and the sacrificial material of the sintered composite is reduced. A porous solid oxide matrix is formed from the reduced and sintered composite. Porosity of the solid oxide matrix is controlled by a volume fraction of the sacrificial material or sintering temperature and a volume fraction of the sacrificial material. Pore size of the solid oxide matrix is controlled by sintering temperature and a volume fraction of the sacrificial material.

Other features and aspects of the present invention are discussed in greater detail below.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

Porous ceramics are a technologically important branch of functional materials for a variety of physical and chemical systems. The properties of porous ceramics depend on porosity, pore morphology, pore size and distribution. In the present disclosure, the synthesis of a homogeneously porous samarium doped cerium ($Ce_{0.8}Sm_{0.2}O_{1.9}$, SDC) matrix with tunable porosity and pore size via a sacrificial template method is demonstrated. The present disclosure describes that the porosity and pore size of the resultant porous matrix can be controlled by the volume fraction of sacrificial material and sintering temperature, along with the monomode pore distribution produced by molecular-level mixing of co-precipitating SDC and sacrificial material. The demonstrated sacrificial template methodology provides an alternative means of tailoring properties of a porous ceramic for particular applications in catalysis, fuel cells and gas separation membranes.

Generally, the method for synthesis of a porous solid oxide matrix includes synthesizing a composite by co-precipitating a porous ceramic material with a sacrificial material. The composite is sintered and the sacrificial material of the sintered composite is reduced. For instance, the composite can be sintered at a temperature of between about 1000 and 1700° C. The sintered composite can be reduced with $H_2$ at a suitable temperature. For example, the sintered composite can be reduced at a temperature of between about 500 and 1000° C. A porous solid oxide matrix is formed from the reduced and sintered composite. Porosity of the solid oxide matrix is controlled by a volume fraction of the sacrificial material or sintering temperature and a volume fraction of the sacrificial material. Pore size of the solid oxide matrix is controlled by sintering temperature and a volume fraction of the sacrificial material.

In accordance with the present disclosure, a samarium doped $CeO_2$ (SDC) ceramic porous microstructure with a tunable porosity, pore size and distribution is described. NiO can be selected as the sacrificial template material because NiO is chemically inert and has a very limited solubility in SDC even at elevated temperatures. However, other suitable materials such as $Fe_2O_3$ can be utilized as a sacrificial template material in accordance with the present disclosure.

For example, use of NiO allows the use of high temperatures to attain a mechanically stronger NiO-SDC ceramic, which is important for practical applications. After the reduction of NiO in reducing atmospheres, the resultant elemental Ni in the composite is then chemically removed by dissolving it into a diluted nitric acid, leaving behind a porous SDC matrix. To maximize the homogeneity, the SDC-NiO composite was prepared by co-precipitation method. The potential use of fabricated homogenous porous scaffold is to support molten carbonate as a functional membrane for application in either SOFCs or $CO_2$ separation.

The following examples are meant to illustrate the disclosure described herein and are not intended to limit the scope of this disclosure.

EXAMPLES

Co-Precipitation Synthesis of SDC-NiO Composite

Figure 1:
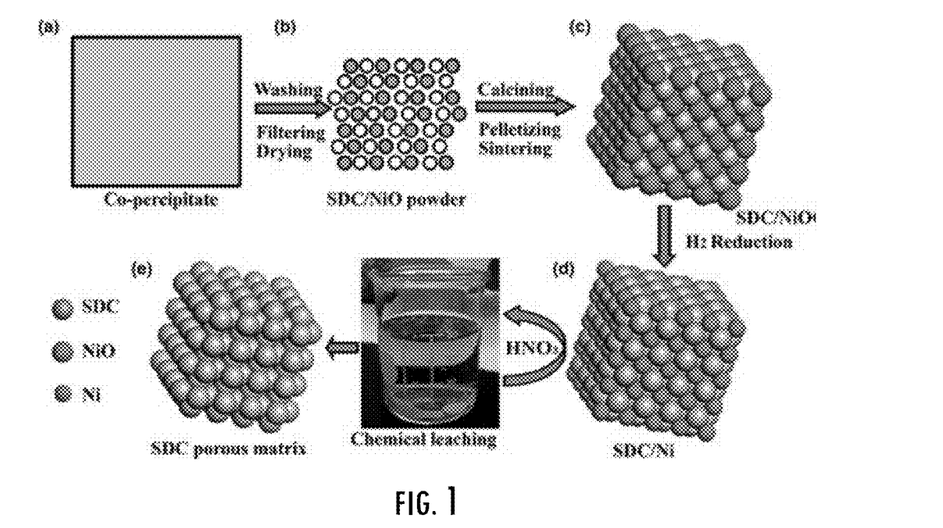
FIG. 1 illustrates a schematic showing individual steps for making porous SDC solid oxide matrix via co-precipitated sacrificial template method in accordance with certain aspects of the present disclosure: (a) co-precipitate of SDC-NiO composite; (b) SDC-NiO composite powder; (c) sintered SDC-NiO composite ceramic; (d) reduced SDC-Ni ceramic; (e) SDC porous ceramic after chemical removal of elemental Ni phase.

The $Ce_{0.8}Sm_{0.2}O_{1.9}$ and NiO composite powders were synthesized by a co-precipitation method. Starting materials $Ce(NO_3)_3.6H_2O$ (Alfa Aesar, 99.95%), $Ni(NO_3)_2.6H_2O$ (Alfa Aesar, 99%), and $Sm(NO_3)_3.6H_2O$ (Alfa Aesar, 99.5%) in a stiochimetric ratio were mixed with deionized water as the precursors and $(NH_4)_2CO_3$ (Fisher Scientific, 95%) as the mineralizer. The volume fractions of NiO in SDC-NiO composite varied among 35, 40 and 50 vol %. After precipitation, the co-precipitate was first washed with DI-water for multiple times, and then filtered, dried and subsequently calcined at 600° C. for 4 h in air to ensure the formation of SDC-NiO composite and removal of any residues. The obtained powders were then pressed into φ13 mm pellets in a thickness of 1 mm, followed by sintering at 1200-1550° C. in air for 10 h. The well-sintered pellets were then reduced in pure $H_2$ at 800° C. for another 10 h to convert nickel oxide to nickel metal. The nickel in the reduced composite was finally removed by dissolving it into a 2.2 M nitric acid at 80° C. for 24 h. The overall synthesis steps are schematically illustrated in FIG. 1.

Characterization of the Synthesized Powders and Porous Matrix

The phase evolutions of the samples at different stages were examined with X-ray diffraction (XRD). The XRD patterns were recorded by a X-ray diffractometer (Rigaku, Japan) equipped with graphite-monochromatized CuKa radiation ($\lambda=1.5418$ Å) at a scanning rate of 10° $min^{-1}$ in 2θ range from 20 to 80°, and analyzed with JADE (MDI) software to identify phases. After powder synthesis, the particle sizes were measured by a particle size analyzer (Horiba, LA950) and the morphology was examined by transmission electron microscopy (TEM, Hitachi H-800, 200 kV). The microstructure of synthesized porous solid-oxide matrix was captured by a field emission scanning electron microscopy (FESEM, Zeiss Ultra) equipped with an energy dispersive X-ray spectroscopy (EDS). To visualize the internal microstructure in a 3-D manner, a Micro 3-D X-ray microscope (XCT-400, Xradia) was employed. The final pore size distributions, median pore sizes and porosities were quantified by a mercury porosimetry (Autopore IV, Micromeritics) at pressures ranging from 0.5-30000 psi.

Results and Discussion

Powder Characterization

Figure 2:
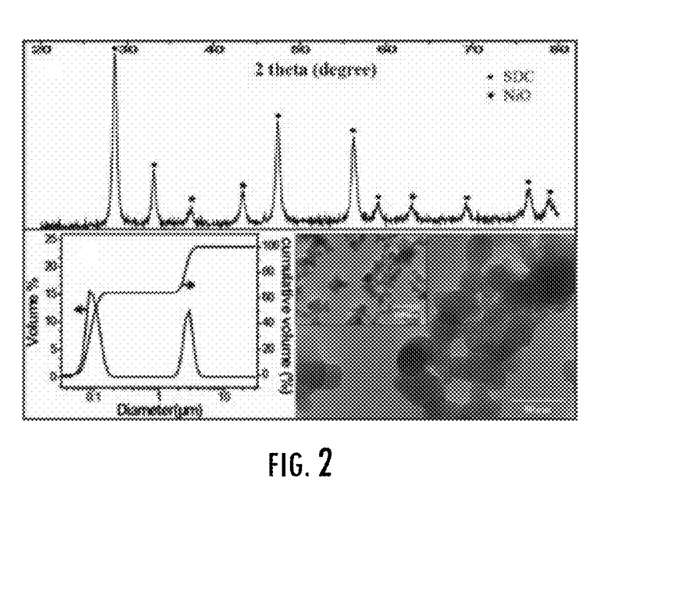
FIG. 2 illustrates a) XRD pattern, b) pore size distribution, c) higher magnification and d) lower magnification of TEM images of SDC60/NiO40 calcined at 600° C. for 4 h, all in accordance with certain aspects of the present disclosure.

The XRD patterns of SDC60/NiO40 (40 vol % NiO) powder after calcining at 600° C. are shown in FIG. 2 (a), where only peaks relevant to NiO and SDC are present, suggesting that no chemical reaction took place between SDC and NiO during the low-temperature calcination. Particle size analysis of the same powder, FIG. 2(b), reveals a bimodal distribution, one at ~0.1 μm and another at ~3 μm. This is likely caused by the agglomeration formed during calcination and inefficient particle dispersion during particle size analysis. However, the high and low magnifications of TEM images, FIGS. 2 (c) and (d), indicate spherical and uniform nano-sized grains of SDC-NiO composite. The 10-nm individual grain size is much smaller than that measured by particle size analysis and prepared by pechini method.

Figure 3:
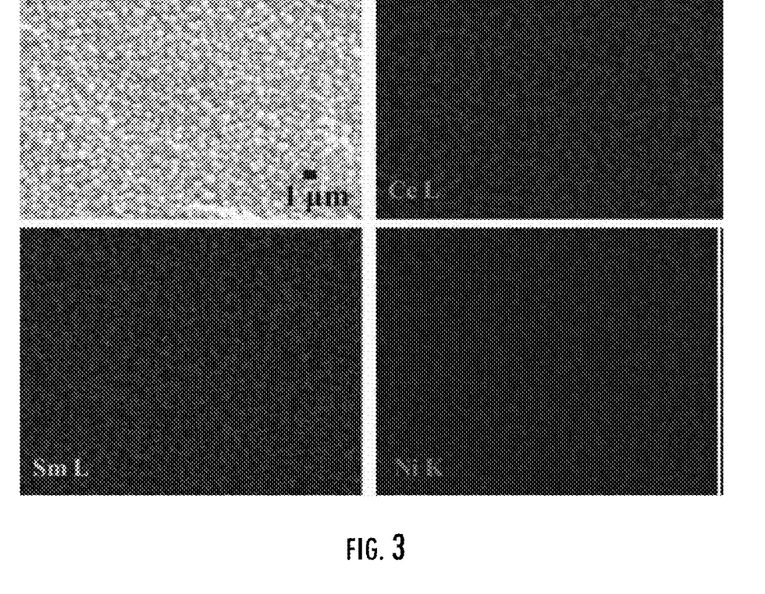
FIG. 3 illustrates (a) FESEM image of SDC50/NiO50 sintered at 1400° C. for 10 h; the corresponding elemental mappings: (b) Ce; (c) Sm; (d) Ni, all in accordance with certain aspects of the present disclosure.

The chemical homogeneity of the formed composite is examined by EDX elemental mapping. The surface morphology of a SDC50/NiO50 (50 vol % NiO) sintered at 1400° C. for 10 h is shown in FIG. 3 (a). It exhibits a dense and uniform microstructure with grain size <1 μm. The corresponding Ce-, Sm- and Ni-elemental mappings are shown in FIGS. 3 (b), (c) and (d), respectively, revealing a very uniform elemental distribution. The present disclosure further confirms the high degree of compositional homogeneity created by molecular level mixing benefited from the co-precipitation method.

Phase Evolution Throughout Synthesis Step

Figure 4:
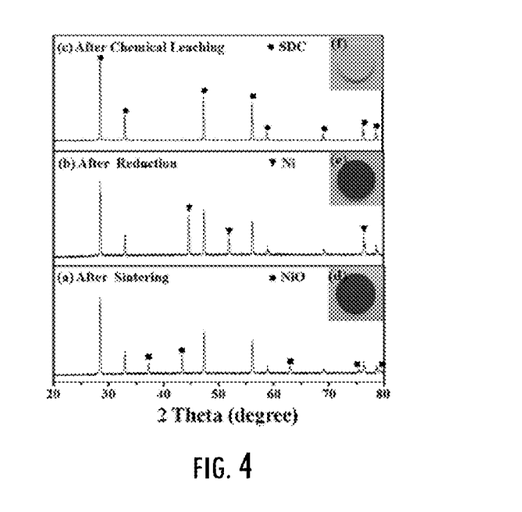
FIG. 4 illustrates evolution of X-ray diffraction patterns of SDC50/NiO50 with processing steps, physical appearances of SDC50/NiO50: (c) after sintering; (d) after reduction; (e) after chemical leaching, all in accordance with certain aspects of the present disclosure.

The phase evolution of SDC50/NiO50 ceramic in the course of synthesis is shown in FIGS. 4(a), (b) and (c). After sintering at 1400° C. for 10 h, FIG. 4(a), XRD patterns indicate the composite containing independent phases of SDC (JCPDS 97-002-8792) and NiO (JCPDS 65-5745). The reduction of NiO to Ni in the SDC matrix, FIG. 4(b), is also evident from comparisons with the standard peaks of Ni (JCPDS 04-0850). Finally, FIG. 4(c) shows that no nickel peak can be detected within the detection limit ox XRD (>2%). In agreement with XRD results, visual inspection of the samples at these three distinct stages also indicates changes in color from dark green (FIG. 4 (d), SDC+NiO) to dark grey (FIG. 4 (e), SDC+Ni) and finally yellowish white (FIG. 4 (f), SDC).

Porous Microstructure

Figure 5:
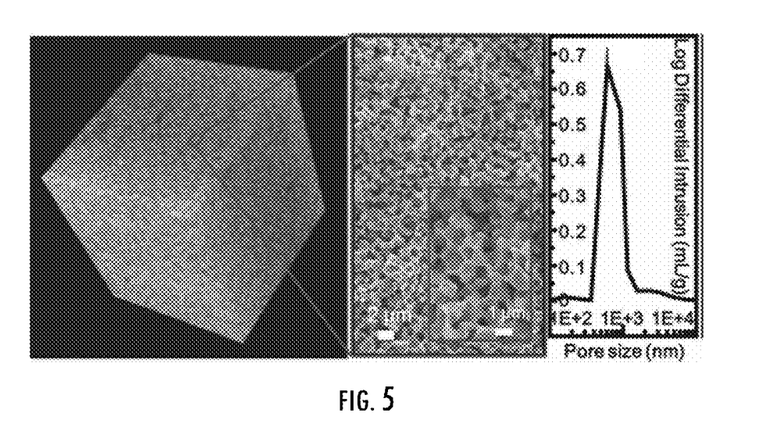
FIG. 5 illustrates (a) 3-D X-ray tomographical view and 2-D cross-sectional views at (b) low magnification and (c) high magnification; (d) Pore size distribution of SDC50/NiO50 porous matrix sintered at 1500° C., all in accordance with certain aspects of the present disclosure.

The internal microstructure of a 1500° C.-sintered SDC50/NiO50 porous matrix revealed by a 3-D X-ray computed tomography imaging technique is shown in FIG. 5 (a); a representative cube size of 200 μm$^3$ is selected. The overall microstructural feature is sponge-like, porous, homogeneous and interconnected. The interconnectivity is clearly resulted from chemical removal of interconnected network of the sacrificial phase NiO. However, more detail of the microstructure is limited by the 1-μm resolution of the X-ray microscope. In order to reveal more detailed internal structure, a traditional 2-D FESEM is used. The low and high magnifications of FESEM images of the SDC50/NiO50 sample are shown in FIGS. 5 (b) and (c). Again, a very homogeneous and submicron-scale porous structure is observed. The median pore size of 901 nm of a mono-distribution and the porosity of 50.2%, both measured by mercury porosimetry as shown in FIG. 5 (d), have an excellent agreement with the microstructural features revealed by the FESEM and the designed porosity.

Temperature Effect on Pore Size

Figure 6:
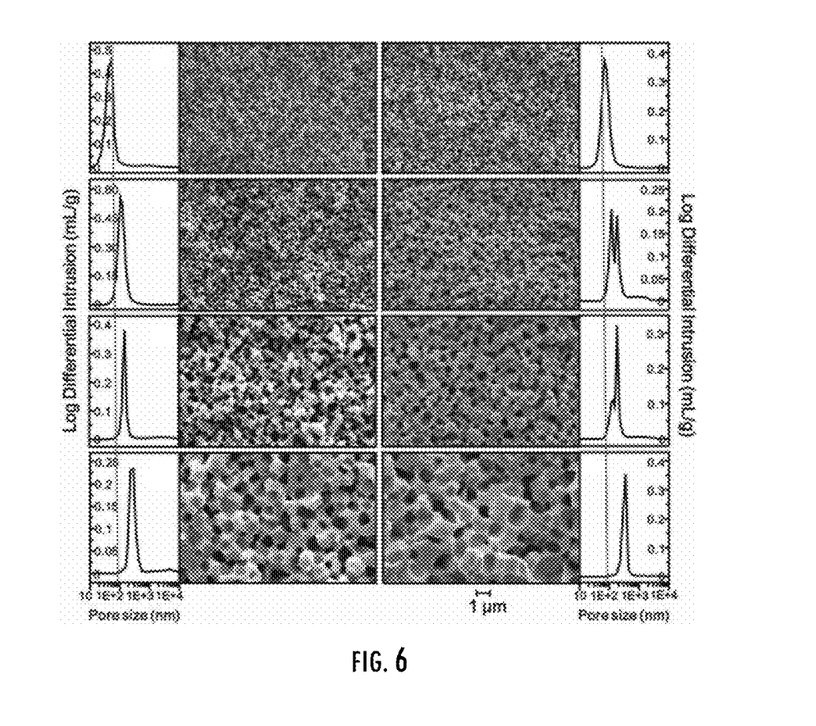
FIG. 6 illustrates FESEM images of SDC65/NiO35 ceramics sintered at (a) 1200; (b) 1250; (c) 1300; (d) 1350; (e) 1400; (f) 1450; (g) 1500; and (h) 1550° C. Plots of pore size distribution are shown in (A)-(H), corresponding to (a)-(h), all in accordance with certain aspects of the present disclosure.
Figure 7:
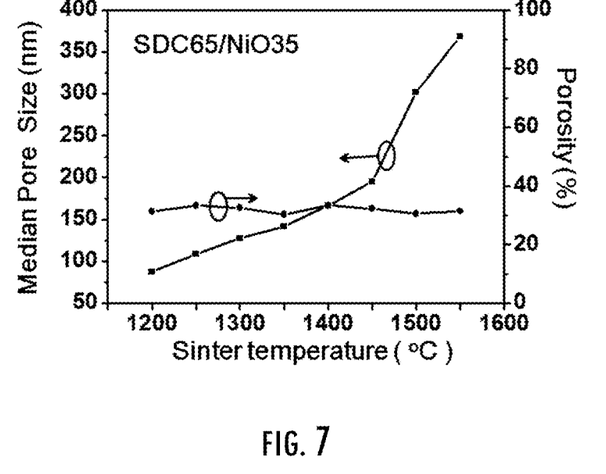
FIG. 7 illustrates a plot of porosity and median pore size of SDC65/NiO35 as a function of sintering temperature in accordance with certain aspects of the present disclosure.

The pore size of porous SDC matrix is expected to increase with sintering temperature as the grain size of sacrificial material NiO increases with sintering temperature. This assertion is evidently confirmed by FIG. 6 (a)-(h), where the cross-sectional views of an SDC65/NiO35 sample sintered from 1200 to 1550° C. in a step of 50° C. show incremental increase in pore size with increasing temperature. The red line shown in FIG. 6 (a)-(h) represents the measured (using mercury porosimetry) median pore size of the sample sintered at the lowest temperature 1200° C. With increasing sintering temperature, the distribution peaks systematically shift away from the red line towards larger pore size. The quantified pore size is further plotted as a function of sintering temperature in FIG. 7. The median pore-size of SDC65/NiO35 porous matrix increases from 87.4 to 368.5 nm from 1200 to 1550° C., consistent with the FESEM results. Since the pores are uniformly distributed across the sample, all the FESEM images were taken from randomly selected areas of the samples, and as such, these are representative of the overall porous SDC matrix. The uniformity of pores is also supported by the mono (or nearly mono-)-mode distribution of pore size revealed by mercury porosimetry and shown in FIG. 6 (A)-(H).

Effect on Porosity

Figure 8:
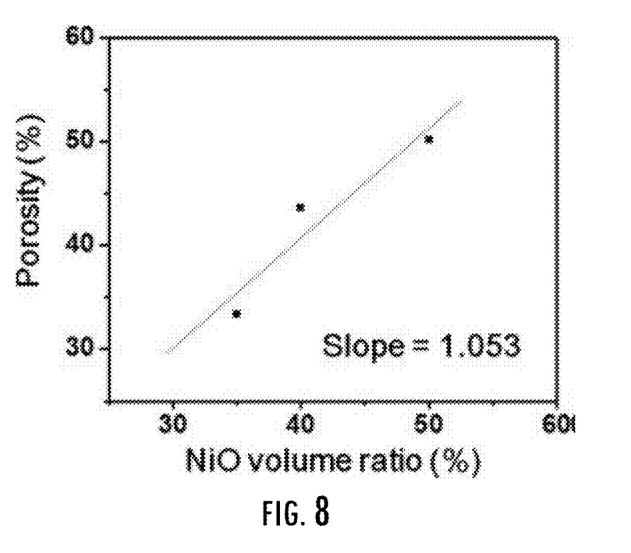
FIG. 8 illustrates a plot of porosity as a function of volume fraction of NiO in SDC-NiO composite sintered at 1400° C. in accordance with certain aspects of the present disclosure.

The porosity of a porous material made from a sacrificial template method is controlled largely by the volume fraction of the sacrificial material. This premise has been indirectly verified in FIG. 7, where the porosity is shown to be insensitive to the sintering temperature. To directly confirm the hypothesis, the measured porosities of three samples all sintered at 1400° C. are plotted as a function of NiO volume fraction in FIG. 8. The best-fitted line almost passes the origin with a slope of 1.053, suggesting that the porosity is directly related to the volume fraction of NiO.

Selection Strategy

Figure 9:
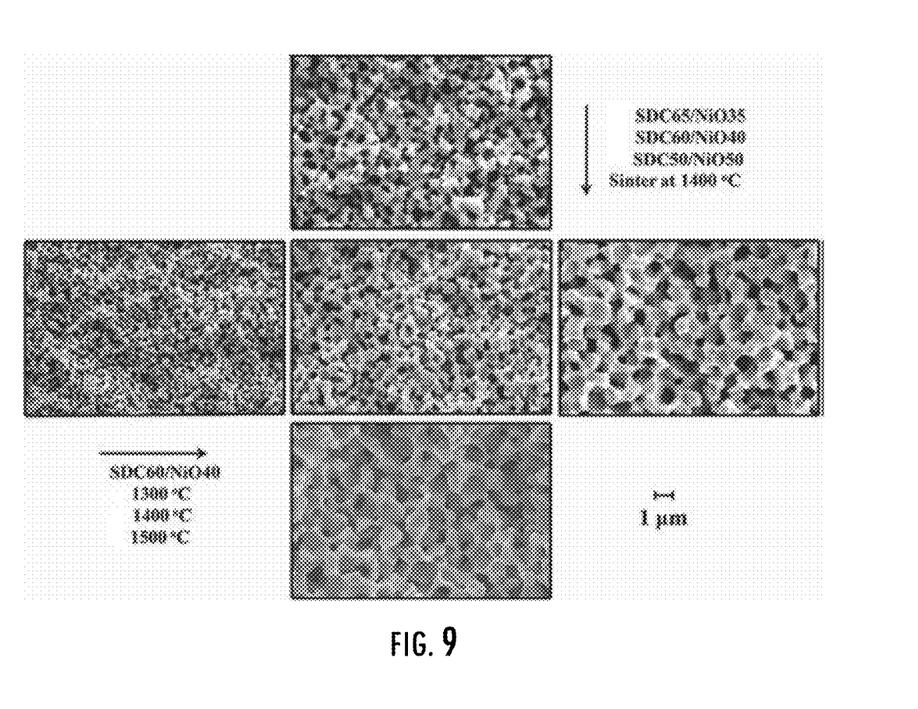
FIG. 9 illustrates microstructures of fabricated porous SDC ceramics at various conditions: (a) 1300° C., (b) 1400° C., (c) 1500° C. of sample SDC60NiO40; (d) SDC65, (b) SDC60, (e) SDC50, all sintered at 1400° C., all in accordance with certain aspects of the present disclosure.

Thus far, it has been demonstrated that with NiO as the sacrificial material, the pore size and porosity of the resultant porous SDC matrix can be, respectively, controlled by sintering temperature and volume fraction of NiO. FIG. 9 shows a composite layout of FESEM images, illustrating the temperature and compositional effects. At the horizontal direction, the effect of temperature on microstructure is shown for SDC60/NiO40. The pore size increases from 135.1 nm at 1300° C., to 259.8 nm at 1400° C. and 723.2 nm at 1500° C. On the other hand, the porosity remains relatively flat with temperature: 43.5% for 1300° C., 43.6% for 1400° C. and 43.9% for 1500° C. At the vertical direction, the compositional effect on microstructure is shown for a given temperature 1400° C. In this case, the porosity increases from 32% for 35 vol % NiO, 43% for 40% vol % NiO and 50% for 50 vol % NiO while the pore size also increases from 167 nm for 35 vol % NiO, 260 nm for 40% vol % NiO and 629 nm for 50 vol % NiO. For a specific application where particular porosity and pore size are required, a porous ceramic matrix can then be readily fabricated based on the mapped processing conditions presented in this study.

CONCLUSIONS

The nano-sized SDC-NiO composite powders have been synthesized by the method of co-precipitation. Thus synthesized intimately mixed powders were then used as the precursor for making homogeneously porous SDC matrix by high-temperature sintering, chemical reduction of NiO to Ni and chemical leaching of Ni. It has been explicitly demonstrated that the porosity can be controlled by the volume fraction of the sacrificial phase NiO while the pore size can be affected by both the sintering temperature and volumetric fraction of NiO. The formed porous network is mechanically strong, homogeneous, interconnected and uniformly distributed across the entire sample. It is highly expected that the synthesized high-quality porous SDC ceramics can find useful applications in catalysis, fuel cells and gas separation membranes.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims.

What is claimed:

1. A method for synthesis of a porous solid oxide matrix comprising:

synthesizing a composite by co-precipitating a ceramic material with a sacrificial material, the method of co-precipitating comprising combining stoichiometric amounts of starting materials including $Ce(NO_3)_3 \cdot 6H_2O$, $Ni(NO_3)_2 \cdot 6H_2O$, and $Sm(NO_3)_3 \cdot 6H_2O$ in the presence of $(NH_4)_2CO_3$ as mineralizer, the co-precipitation forming a samarium doped cerium (SDC)-nickel oxide (NiO) composite that includes the NiO as the sacrificial material;

sintering the composite;

reducing the sacrificial material of the sintered composite;

removing the reduced sacrificial material from the sintered composite to form the porous solid oxide matrix; and controlling a median pore size of the porous solid oxide matrix by controlling a sintering temperature of the composite and a volume fraction of the sacrificial material; wherein an increase in the sintering temperature at a given volume fraction of the sacrificial material will increase the median pore size of the porous solid oxide matrix without an equivalent increase in porosity of the porous solid oxide matrix.

2. A method as in claim 1, wherein sintering the composite occurs at a temperature of between about 1000 and 1700° C.

3. A method as in claim 1, wherein reducing the sacrificial material occurs in the presence of $H_2$.

4. A method as in claim 3, wherein reducing the sacrificial material occurs at a temperature of between about 500 and 1000° C.

5. The method of claim 1, wherein the SDC-NiO composite includes the NiO as the sacrificial material at a volume fraction of from 35% to 50%.

* * * * *